United States Patent Office 3,135,728
Patented June 2, 1964

3,135,728
LIGNITE PRODUCTS AND METHODS OF MAKING SAME
Kenneth P. Monroe, Houston, Tex., assignor to Magnet Cove Barium Corporation, Houston, Tex.
No Drawing. Original application Oct. 28, 1957, Ser. No. 692,562, now Patent No. 3,039,958, dated June 19, 1962. Divided and this application Nov. 27, 1961, Ser. No. 163,005
13 Claims. (Cl. 260—125)

This invention relates to new and novel sulfur-containing lignite compounds and to methods of making the same.

Lignite, an abundant and cheap domestic raw material, previously has been used to control the viscosity of oil well drilling muds. Its usefulness as such a "thinner" has been limited because it is progressively coagulated and so rendered much less effective by commonly encountered mud contaminants such as common salt, calcium compounds (e.g. lime and gypsum), etc.

To act as a thinner, lignite must be used in conjunction with caustic or in a highly alkaline mud. To obtain optimum thinning treatment, the alkalinity of the mud (or the caustic to lignite ratio) frequently will have to be varied from mud to mud depending upon the type of mud, the contaminants present, and other factors. In some cases, equal parts of caustic and lignite are required to obtain satisfactory thinning action. One practice has been to mix raw lignite and caustic together at the well site in order not only to solubilize the lignite, but also to give the mud the required causticity for the lignite to exert its maximum thinning effect. This requires not only handling of two separate materials, but also the handling of large amounts of caustic, which is fraught with danger. Furthermore, control in the field of the caustic-lignite reaction and of the amount of caustic present in the mud to get optimum results are difficult so that treating results tend to be erratic.

Attempts have been made to pre-react lignite with caustic or soda ash to improve its usefulness as a mud thinner and also to provide a single material which can be manufactured under controlled conditions at a central site and then shipped to the field for use as a single additive. Such a practice has not been entirely successful, one reason for the lack of success being that it has not been possible to pre-react the necessary large amounts of caustic with lignite and yet obtain a dry, non-caking, free-flowing product by conventional drying methods and one which is safe to handle. Accordingly, the amount of caustic pre-reacted with the lignite is limited to a smaller amount and in many cases, additional caustic must be added to the mud by the driller along with the pre-reacted lignite.

In accordance with one aspect of this invention, there are provided lignitic derivatives which do not require the use of large amounts of added caustic to thin a mud and which do not have many of the other disadvantages inherent in conventional caustic-lignite thinners. Thus, there is provided a new and novel process in which lignite is reacted, in an alkaline medium, with elemental sulfur and the resulting thio-lignite being oxidized or oxygenated to produce a series of new and novel sulfur-containing lignite products all of which have improved hydrophillic properties as compared to raw lignite. These products can be termed lignite disulfide, lignite sulfones and sulfoxides and lignite sulfonate.

It will be noted that all of these products have a sulfur atom bonded directly to a carbon atom and the terms used to denote these products will be construed accordingly and especially the terms "sulfonate" and "sulfonated" as herein used shall mean the true carbon to sulfur bonded sulfonates to differentiate from the carbon to oxygen to sulfur bonded sulfates which are sometimes erroneously termed sulfonates.

It has been found these products can be used as dispersing agents, particularly as thinning and yield value controlling agents for drilling muds and other well fluids. The efficiency of these agents is usually at least equal in dispersing power to conventional quebracho-caustic and lignite-caustic dispersants and, in many mud systems, particularly those contaminated with calcium compounds, they are superior to these two conventional dispersants.

The new products above referred to can be provided as dry products for commercial use by conventional drying methods, such as by drum drying, spray drying, or the like. They are stable, non-caking and free-flowing products when packaged, stored and transported in conventional multi-wall paper bags. They are readily useable by the oil well driller without additional processing, affording the driller a lignitic additive which in many systems can be used without the addition of caustic to yield the desired maximum yield point control of muds in the presence of commonly encountered mud contaminants. The products are non-corrosive to the skin and are not prone toward spontaneous combustion under customary conditions of manufacture, storage and transportation.

It is accordingly an object of this invention to provide new lignitic derivative products of the types above-mentioned and to provide a process for making such lignitic products, the process being directed to the upgrading of lignite into a more hydrophillic form such that it can have varied uses such as an efficient dispersant not requiring large quantities of caustic for its use.

Another object is to provide a process for treating lignite to convert it into an efficient dispersing agent finding particular use in drilling muds, the treatment involving the reaction of lignite with elemental sulfur and an alkali-metal hydroxide and an oxygenating compound in such a manner that the resulting reaction product is a sulfonated lignite having an increased dispersing power even in the absence of large quantities of caustic and which is chemically stable so that it can be packaged, sold, and used as a single product.

Another object is to provide a process for making a novel product comprising sulfurized lignite.

Another object is to provide such a process wherein the sulfurized lignite is oxidized to convert it into one of a series of new and novel products comprising the lignite sulfones, sulfoxides and sulfonates.

Another object is to provide a process for sulfonating lignite in which conventional sulfonating compounds, such as sulfuric acid or oleum, are not used due to their inability to sulfonate the lignite since the latter is an active reducing agent, the sulfonation being accomplished by first sulfurizing the lignite and then oxidizing it.

Other objects, advantages and features of this invention will be apparent to one skilled in the art upon consideration of the written specification and claims.

In accordance with the process of this invention, raw lignite is dispersed or suspended in reaction medium and therein reacted with an alkali-metal base and elemental sulfur at an elevated temperature and with a time-temperature cycle causing substantial chemical combination of the elemental sulfur with the lignite to produce a thio-lignite (lignite sulfhydril). This thio-lignite is readily and completely oxidizable to lignite disulfide by aerating it with air or other oxidizing compound. The lignite disulfide can then be aerated or oxygenated to form lignite sulfoxides and lignite sulfones. Still further aeration or oxygenation converts the sulfoxides and sulfones to sulfonates to thereby produce lignite sulfonate which is preferred as a dispersing agent.

The first reaction (sulfurization of lignite to form thiolignite) is carried out in an alkaline reaction medium so that the base in such medium can initially partially solubilize the lignite and thereby facilitate and accelerate its reaction with the elemental sulfur. Alternately, the lignite can be pre-reacted with a base.

The reactions involved in the process can be written as follows:

(1) For the initial sulfurization reaction:

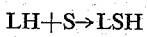

$$LH + S \rightarrow LSH$$

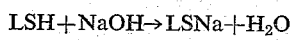

$$LSH + NaOH \rightarrow LSNa + H_2O$$

LH being the lignite molecule, and H being a mobile reactive hydrogen atom bonded directly to a carbon atom in the lignite molecule. LSH is lignite sulfhydril, or thiolignite, and LSNa is th sodium salt of lignite sulfhydril.

(2) For the conversion, through oxygenation, of the original thio-lignite (or its sodium salt) to the corresponding disulfide, with liberation of base in the case of the sodium thio-lignite:

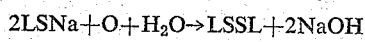

$$2LSNa + O + H_2O \rightarrow LSSL + 2NaOH$$

(3) For the continued oxygenation of the di-sulfides to the mono- or di-sulfoxide and mono- or di-sulfone form:

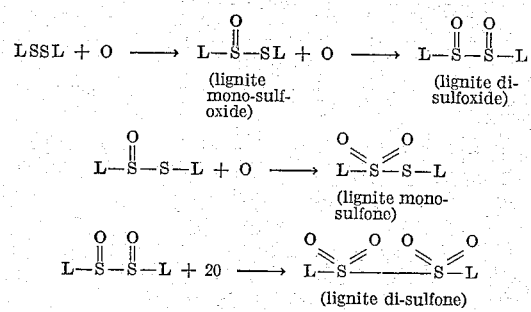

(4) As well as a variety of sulfur linked lignite man-made polymers; e.g.

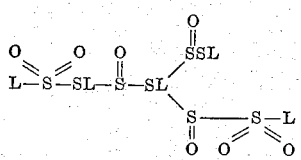

(5) And for the further oxygenation of these compounds to the sulfonate form:

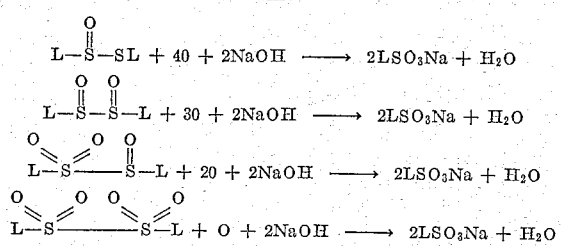

On the other hand, the over-all reaction can be represented by:

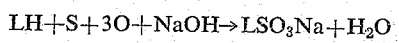

$$LH + S + 3O + NaOH \rightarrow LSO_3Na + H_2O$$

where LH is the lignite molecule.

It will be noted from the foregoing reactions that during the original oxidation of the lignite to the corresponding disulfide, there is a substantial liberation of base with a resulting increase in pH of the reaction medium. Subsequently, during the further oxygenation to the sulfonate form, there is a consumption of base and, accordingly, a drop in pH of the reaction medium. As will be more fully pointed out below, this rise and fall in pH affords a convenient index for controlling the reaction and the extent of the oxygenation.

While the reactions involved in the process of this invention have been set out as above, it is to be understood that any error therein is not to be limiting on the invention because it is shown that elemental sulfur will react with lignite and alkali-metal hydroxide and that the resulting reaction product can be oxygenated to increase the hydrophillic tendencies of the original lignite. Accordingly, the practice of such steps will produce the products of this invention.

Lignite is found in many parts of the United States. It is often defined as a variety of coal intermediate between peat and bituminous coal, especially one in which the texture of the original wood is distinct. It is also called "brown coal" or "wood coal." Its chemical characteristics and composition have been widely described in the literature, such as in the article by Yohe and Blodgett of the Illinois Geological Survey, in the Journal of the American Chemical Society, vol. 69 (1947), and in the U.S. Bureau of Mines Information Circular 7691, parts 1 and 2, published, July 1954. Lignite generally comprises carbon, hydrogen, oxygen, nitrogen and sulfur, the latter being present in an amount of approximately ⅔ of 1 percent by weight. In the sulfurization process of this invention, much greater amounts of sulfur, up to and above 25 percent by weight of the original lignite, are reacted with the lignite. Accordingly, when the term "sulfurized" lignite is referred to herein, it is not referring to the raw lignite which contains only a small amount of combined sulfur, but is referring to raw lignite to which has been added sulfur by the reaction of this invention.

In general, the term "lignite" will be used herein to mean not only lignite per se but also all naturally occurring carboniferous minerals containing 10 percent or more, preferably 30 to 50 percent of humic acid.

As indicated above, the sulfurization reaction is conducted in an alkaline reaction medium. The reaction medium can be of any suitable type which does not interfere with the reaction and containing some water. As a practical matter, water will ordinarily be used as the reaction medium, although in some cases non-aqueous media can be used where the raw lignite contains sufficient absorbed water for the reaction. It will ordinarily be made alkaline by the addition of a suitable base, preferably in alkali metal hydroxide such as sodium, lithium or potassium hydroxide. The alkali metal carbonates and ammonium hydroxide can be used but are less preferable. The amount of the base to be used can be varied over considerable range. Its principle function is thought to be to impart initial solubility to the raw lignite to facilitate its reaction with the elemental sulfur. In order to achieve a desired reaction rate, the pH of the reaction medium initially should be at least 10 (a range of 10 to 14 being preferred). It is immaterial whether the base is separately added to the reaction medium along with the other reactants or is already present therein. It is preferred that the amount of the base be within the range of 15 to 100 parts by weight per 100 parts of raw lignite. Preferably, an amount within the range of 15 to 75 parts per 100 parts of lignite is used. The use of too small amounts of base slows down the sulfurization reaction and tends to make the reaction produce products other than those desired for subsequent oxidation. Accordingly, 15 parts of alkali metal hydroxide per 100 parts raw lignite can be taken as a workable minimum. Larger amounts of the hydroxide tend to speed up the various reactions and sometimes prove useful in the final product as explained below. The base can be pre-reacted with the lignite before the sulfur is brought into the reaction or it can be added with the sulfur and the initial solubilization and sulfurization reaction conducted at the same time. In this connection, commercial alkali lignite can be used as a starting material instead of raw lignite.

In some cases, it is desired that the final lignite product have a certain causticity. Thus, in using the instant lignitic derivatives as mud thinners, optimum results are frequently obtained when a certain amount of caustic is present. For example, in lime base muds, additional caustic has been found to be advantageous. The caustic to be used can be selected from the aforesaid range of 15 to 100 parts per 100 parts of raw lignite to give the desired degree of causticity to the final product so that when the dry product is mixed with the mud or other well fluid, the latter has the desired causticity. Alternatively, an amount of caustic in the lower part of the range, and less than that desired in the final dry product, can be used during the sulfurization reaction. Then the additional caustic required to yield the final desired caustic concentration can be added to the final product, the only requirement being that the caustic be intimately mixed with the lignite reaction product. The final product can be dried by conventional methods. It is free-flowing, non-hygroscopic and substantially non-corrosive to the skin. In effect, then, the lignite product "masks" the caustic, rendering it incapable of doing damage when the dispersant caustic mixture is used in its intended manner.

The above applies not only to the use of the sulfonated lignite product of this invention, but also to the use of the intermediate products, namely, the lignite sulfones and lignite sulfoxides.

The amount of sulfur reacted with the lignite during the sulfurization reaction will be determined by the amount of sulfur desired in the final product. An amount in the range of 1 to 40, preferably 3 to 25 and still more preferably between 6 and 7, parts by weight per 100 parts by weight of the raw lignite can be used.

In connection with the sulfur concentration, it has been found that when the oxygenated sulfur-containing lignite products are to be used as thinners in muds, the optimum amount of sulfurization is about 6.7 percent sulfur expressed as elemental sulfur and based upon the raw lignite. Thus, with a sulfur content at this figure, the dispersing powers of the oxygenated sulfur-containing lignite are at an optimum for a broad range of different types of muds and the use of a lesser or greater amount of sulfur somewhat decreases the dispersing power thereof in some muds. It has been found that for a few muds, the degree of sulfurization does not seem important insofar as its effect upon certain qualities of the mud, such as apparent viscosity. In certain other types of muds, such as lime base muds, the degree of sulfurization has a pronounced effect in respect of the products capacity to reduce the yield value of the mud. However, it is to be noted that sulfurization to a greater or a lesser extent than the optimum 6.7 percent still results in an operable product although it may be one requiring larger amounts thereof to obtain the same degree of yield value control as with the more optimum 6.7 percent product.

The sulfurization reaction proceeds at elevated temperatures and should be one which is above the melting points of sulfur (246° F. which is the maximum melting point of sulfur). Of course, the reaction rate increases with temperature and it is usually preferred to employ a reaction temperature in the range of 280 to 320° F. At these temperatures, the time of reaction for substantially complete conversion of the lignite will usually fall within the range of 1 to 6 hours. Thus, the lower limit of the temperature range is rather flexible but should be high enough to give the desired degree of conversion within the desired time and also be above the maximum melting point of the elemental sulfur. Of course, lengthening the reaction time permits lowering of the reaction temperature to give the same conversion. On the other hand, the upper limit of the temperature range is dictated by the maximum temperature which the lignite will tolerate without serious disruption of its large molecules and consequent deterioration of the protective colloidal action of the sulfur-containing products. Approximately 360 to 375° F. represents a workable maximum which will not cause such disruption of the lignite molecules. Thus, the broad temperature range can be stated to be 246° to 375° F.

In a preferred mode of procedure, the lignite is mixed with a base in aqueous reaction medium and the mixture refluxed to partially solubilize the lignite. The refluxing temperature can be in the range of 190° to 212° F. and usually for a time within the range of ½ to 3 hours. Elemental sulfur is then added to the mixture and it is autoclaved or otherwise subjected to temperatures in the higher range mentioned above until the sulfurization reaction is complete. Of course, if desired, the initial reactants can all be placed directly in the autoclave and subjected to the elevated temperature from the beginning without the initial refluxing step.

After the sulfurizing reaction, the reaction medium containing the sulfurized lignite can be oxidized, as by simple aeration, to convert the lignite sulfhydril (the alkali metal thio-lignite) to lignite disulfide. Such oxidation proceeds quite rapidly and is usually complete within ¼ to 2 hours when moderate aeration is used. The conversion of the thio-lignite to the lignite disulfide is accompanied by a rise in pH of the reaction medium due to the liberation of the alkali metal hydroxide during the conversion. In most cases, the pH will rise from 1 to 3 pH units depending upon the amount of base originally employed as well as the extent of sulfurization. Accordingly, this furnishes a useable index for judging when the conversion to lignite disulfide has been completed in that the pH of the reaction medium can be followed and when it reaches a peak, the conversion will be substantially completed.

While the lignite disulfide thus prepared can be recovered from the reaction medium, by simple drying procedures, to provide a product which can be used as a dispersing agent in mud, it has been found possible to increase the hydrophillic properties of the lignite disulfide so as to improve its dispersing powers by oxidation (oxygenation) of the same to convert it to a sulfoxide, then to a sulfone and finally and most preferably to a sulfonate, all of which are improved dispersants for a mud.

The starting material for producing the sulfonate can be any of the lignite products mentioned above including the lignite disulfide, the lignite mono- and di-sulfones, and the lignite mono- and di-sulfoxides. As a matter of fact, the oxygenation reaction can be considered as starting with the conversion of the thio-lignite to the lignite disulfide and thence through the sulfoxide and sulfone forms to the final sulfonate form. This oxygenation reaction can be stopped at any intermediate time to produce any one of these intermediate products or admixtures of the same. However, it is to be noted that as the oxygenation proceeds through these various series of reaction products, the difficulty of the oxygenation increases from product to product. For example, the conversion of the thio-lignite to the lignite disulfide occurs very readily and in fact, the thio-lignite will avidly absorb oxygen from the air upon standing to be converted to lignite di-sulfide. The conversion from the disulfide to the sulfone or sulfoxide form occurs with somewhat more difficulty and the further conversion to the sulfonate is still more difficult.

There are a number of oxygenation agents which can be used. For the conversion of the thio-lignite to the disulfide form, any reactive oxidizing agent is operable. Oxygen, preferably ordinary air (for economic reasons), is the preferred oxidizing agent. Others include chlorine gas, alkali metal nitrites, the alkali metal hypochlorites, hydrogen peroxide, ozone and others. For the oxygenation reaction to convert the disulfide to the sulfone and sulfoxide forms and for the final conversion of these to the sulfonate form, any oxygenation agent capable of contributing oxygen to the reaction, is usable. Again oxygen, preferably ordinary air, is preferred, although it requires a reaction time within the range of 6 to 30 hours, usually 24 hours, for complete conversion to the sulfonate form. In order to shorten the reaction time, ozone, which has a higher oxidation potential than ordinary oxygen, and is thought to have an oxidative catalytic power, can be used. In such case, the reaction time is reduced to be within the range of 2 to 6 hours under ordinary circumstances.

From the foregoing it will be seen that the conversion of the thio-lignite to the disulfide can be accomplished with a broad class of oxidizing compounds or agents whereas the oxygenation reaction should proceed with oxygen contributing compounds preferably having an oxidation potential equal to or higher than that of atmospheric oxygen.

While the oxygenation reaction proceeds in the absence of a metal-based catalyst, particularly when ozone is used, it is preferred to use a suitable metal-based catalyst to speed up the reaction and this is particularly helpful when ordinary oxygen or air is used. The catalyst should be an oxygen-containing compound of a polyvalent metallic element known to have more than one valence toward oxygen. For example, manganese may have valences of 2, 4, 6 or 7 while vanadium may have valences of 2, 3, 4 or 5. It is desirable, but not absolutely essential, that the oxygen-containing compound of the polyvalent metallic element be capable of becoming the negative component of an alkali metal salt having at least a moderate solubility in water over the alkaline pH range. For example, manganese dioxide is almost insoluble in neutral watery suspension but forms manganites, manganates, and permanganates which are reasonably soluble in water. Likewise vanadium may enter into the negative component as ammonium or alkali meta-vanadates or as the alkali metal salts of vanadous acid and of the other acids with vanadium in still other valence states. In addition to the oxygen-containing compounds of vanadium and manganese, there can also be used the oxygen-containing compounds of copper, chromium, molybdenum, selenium, tellurium, tungsten, cerium, arsenic, antimony, iron, cobalt and nickel. Catalysts which are preferred, primarily for economic reasons, are cobalt acetate and also manganese dioxide promoted with ammonium meta-vanadate, and sulfide-resistant catalysts such as alkali-metal molybdates, for example, these molybdate catalysts preferably being "promoted" by smaller amounts of vanadium compounds, especially ammonium meta-vanadate. In connection with catalyst choice, it is known that certain catalysts, notably the molybdate catalysts, are "sulfur-resistant." It is surmised that the non-sulfur-resistant catalysts lose their oxidation, catalytic efficiency in the presence of sulfur or sulfur-containing compounds because the metal component of these catalysts is progressively converted to the metal sulfide which is too water-insoluble to continue to be fully effective as a catalyst. Therefore, in practicing this invention with a catalyst, it is recommended that a sulfur-resistant catalyst be employed where possible although it is to be recognized that the effect of sulfur on the catalyst may be less pronounced in some of the oxidation (oxygenation) steps than in others. For example, the sodium salt of lignite sulfhydril may hydrolyze to some limited extent to yield NaSH and even traces of $H_2S$ which would react with some otherwise efficient oxidation catalysts to yield insoluble metallic sulfides. For this reaction in particular, a sulfur-resistant catalyst, if a catalyst is employed, should be chosen to keep catalyst consumption at a minimum. For some of the subsequent oxygenation steps, such as the sulfone to sulfonate oxygenation step, the problem may be less pronounced and less sulfur-resistant catalysts can be employed. If it is desired to continue oxygenation of the lignite molecule after the sulfur has been completely oxygenated to the sulfonate form, any oxidation catalyst, including those which have very low sulfur resistance can be used because there is little if any chance that the sulfur of the sulfonate group can convert the metal of the catalyst to an insoluble sulfide. The amount of catalyst to be used will be determined primarily by economic considerations, that is, the cost of the catalyst per se, the amount required to be used to obtain the desired reaction in a minimum of time, etc. The amount used is not critical as long as enough is present to speed up the reaction so that it will be completed in the desired time. In the case of the sodium molybdate-ammonium meta-vanadate combination, the amount of sodium molybdate can be within the range of $\frac{1}{10}$ to 5% of the weight of the original lignite and the amount of ammonium meta-vanadate equal to approximate $\frac{1}{10}$ to $\frac{1}{2}$ the weight of the sodium molybdate. An amount of cobalt within the range of that given above for the sodium molybdate can be used. The same range applies to other catalysts. However, it must be emphasized (1) that the oxygenation reaction can proceed without a catalyst, (2) that the amount of catalyst used is not important except excessive amounts are expensive and insufficient amounts may not cause the reaction to be completed in a desired time, and (3) the type of oxygenation catalyst can be chosen from those known to the prior art.

The oxygenation reaction can be carried out in various manners. For example, it can be carried out in a series of separate steps: (1) oxidation of the thio-lignite to the disulfide form, (2) oxygenation of latter to the sulfoxide form, (3) oxygenation of the sulfoxides to sulfones and finally (4) oxygenation of the sulfones to the sulfonate form. Alternatively, oxygenation can be used throughout, e.g. thio-lignite can be converted to the disulfide form by simple aeration in a very short time and this can be followed by ozonation or catalyzed aeration or oxygenation to convert the disulfide to any one of the succeeding oxygenated products. Also the catalyzed aeration or the ozonation can start with the thio-lignite and proceed to produce any one or more of the succeeding products. It is preferred that the oxygenation reaction be carried out with the lignite product in an aqueous medium wherein it is intimately contacted with the oxygenating agent. Catalyst, if used, can be added and preferably should be added at least before the disulfide is to be converted to one of the subsequent products. Conversion of the thio-lignite to the disulfide form occurs so rapidly that a catalyst need not be ordinarily employed for such reaction.

The pressure at which the oxygenation reaction is conducted can vary between wide limits, although usually atmospheric pressure will be preferred.

The temperature at which the oxygenation reaction is conducted can also vary considerably, but should be below the temperature which the various lignite products will tolerate without serious disruption of the molecules. Approximately 360° to 375° F. represents a workable maximum. However, from a practical standpoint, a temperature within the range of 40° to 212° F., preferably 120° to 160° F., can be used. Where the reaction is carried at super-atmospheric pressure, the range can extend as high as 375° F. Thus the broad range can be stated as 40° to 375° F.

The reaction time and temperature are adjusted relative to each other in manners well known to those skilled in the art so that the oxidation and oxygenation reactions will proceed to a point such that the final product has the desired chemical composition, i.e. is a disulfide, or a sulfoxide, or a sulfone, or a sulfonate. It is preferred that the reaction be carried to the extent that the thio-lignite is oxidized to the final sulfonate form at which it will display a maximum hydrophillic tendency. One way of easily determining the optimum time and temperature conditions is to merely sample the reaction mixture after various times and temperature reaction cycles and then determine the efficiency of the samples by routine tests, such as by using mud samples.

A useful control is measuring the pH during the oxygenation reaction. As indicated above, there will first be rapid rise in pH during the conversion of the thio-lignite to the disulfides, followed by a more gradual decrease in pH as the disulfides are converted to the final sulfonate. When the pH becomes substantially constant, the final product will be in the sulfonate form.

While, as disclosed above, the lignite disulfide, lignite mono- and disulfides, the lignite mono- and disulfoxides, the lignite mono- and disulfones and the lignite sulfonate are useful as thinning agents for oil well fluids and muds, they also can have other uses such as dispersants in systems other than muds, and the disulfide, sulfoxide and sulfone forms can be polymerized to provide relatively high molecular weight polymers finding use as fluid loss control agents in muds and other uses.

In using the lignite derivatives of this invention in the thinning of a well fluid comprising an aqueous dispersion of clay (e.g. to reduce the yield value of such fluid), the lignite derivative is added in the same manner, well known to those skilled in the art, as conventional caustic-quebracho, alkali lignite and other thinners have been used in the past. Thus, the selected derivative can be simply added to the fluid and mixed therewith. The optimum amount to be employed will depend upon the characteristics of the particular well fluid being treated but generally an amount in the range of 0.5 to 10 pounds per barrel will suffice. In any event, the amount will be that sufficient to reduce the yield value of the well fluid as desired. Usually the pH of the fluid will be in the alkaline range (pH 7 to 14) but such as not necessary.

EXAMPLE I

Lignite disulfide was prepared by first mixing 600 parts of lignite and 363 parts of NaOH in 2280 parts of water and then refluxing the mixture for one hour at 203 to 212° F. Thereafter 150 parts of elemental sulfur were added to the mixture which was then heated in an autoclave for 5 hours at a temperature within the range of 297 to 315° F. After cooling, the autoclave was opened revealing a homogeneous black liquid with a pH of 8.7.

The autoclaved mixture was then diluted with water to about 18% dissolved solids content, 12 parts of sodium molybdate added and aerated with air for 3 hours. Due to the rapid conversion of the sodium thio-lignite to lignite disulfide with liberation of NaOH, the pH and temperature rose rapidly as follows:

Table I

| Hours Aeration | Temp., °F. | pH |
|---|---|---|
| 0 | 82 | 8.7 |
| 0.25 | 122 | 10.9 |
| 0.5 | 127 | 11.4 |
| 0.75 | 135 | 11.3 |
| 1 | 129 | 10.9 |
| 2 | 115 | 10.6 |
| 3 | 104 | 10.6 |

Samples of the mixture were taken at the 0, 0.75 and 3 hour intervals. None of the samples had any discernable elemental sulfur therein. The dissolved or dispersed solids in the 0.75 hour sample were predominantly lignite disulfide, whereas the solids in the 3 hour sample were a mixture of lignite disulfide, lignite mono- and di-sulfoxides and lignite mono- and di-sulfones. Some thio-linkage-connected lignite polymers were also present.

EXAMPLE II

In order to convert the compounds obtained by the procedure in Example I to sulfonates, the aerated product was ozonated in a cavitator by introducing an ozone-enriched oxygen stream (about 1.5% ozone), diluted with about an equal volume of air, through the cavitator gas inlet and bubbling the gaseous stream through the charge. The gas flow rate was about one liter per minute per 60 parts of the original raw lignite. Due to the conversion of the sulfur-lignite compounds to lignite sulfonates, with a consumption of NaOH, the pH of the charge dropped. The reaction was demonstrated by a temperature rise.

Table II

| Hours Ozonation | Temp., °F. | pH |
|---|---|---|
| 0 | 77 | 10.6 |
| 1 | 82 | 10.2 |
| 2 | 86 | 9.9 |
| 4 | 93 | 9.7 |
| 6 | 95 | 9.5 |
| 8 | 97 | 9.2 |
| 10 | 99 | 8.9 |
| 13 | 95 | 8.7 |

At no time during the ozonation could any free ozone be detected above the charge.

The resulting product was dried and formed a dry free-flowing powder which remained in such condition even though exposed to the atmosphere for an extended period of time.

The ozonated product was sodium lignite sulfonate containing 25% of elemental sulfur, based upon the original weight of raw lignite, the sulfur being in the sulfonate form.

EXAMPLE III

A series of lignite sulfonates of varying degrees of sulfonation were prepared and tested in different types of muds. The amounts of lignite, NaOH, water and sulfur shown in Table III were mixed together and autoclaved for five hours at a temperature in the range of 297 to 315° F. After cooling, the autoclaved charge was diluted until the dissolved solids were in a 5% concentration (except in the case of run number 220 which was diluted to 10%). To the diluted charge were added 6 parts of sodium molybdate and two parts ammonium meta-vanadate, following which the charge was aerated with air for 24 hours at a temperature in the range of 104 to 108° F. Thereafter, the charge was dried to constant weight at 230° F. Upon crushing, the final product was a free-flowing powder.

Table III

| Run No. | Lignite | NaOH | Water | Sulfur | | Yield |
|---|---|---|---|---|---|---|
| | | | | Parts | Percent | |
| 224 | 600 | 177 | 2,280 | 21 | 3.5 | 95.6 |
| 220 | 600 | 200 | 2,280 | 40 | 6.7 | |
| 225 | 600 | 150 | 2,280 | 72 | 12 | 97.7 |
| 226 | 600 | 225 | 2,280 | 108 | 18 | 92.2 |
| 227 | 600 | 335 | 2,280 | 150 | 25 | 89.5 |

In the table, the figures given under the column labeled "Percent Sulfur" is the amount of elemental sulfur combined with the lignite and based on the original raw lignite; of course, this elemental sulfur in the final product was in the sulfonate form. The figures given for "Yield" are precentages of theoretical yield.

For each run, there was no discernible free elemental sulfur present in the final product and the latter was freely soluble in water. The gain in weight of the lignite material during the aeration step varied with the different runs, being about 18% gain for number 225 (12% sulfur).

During each reaction, there was a significant and rapid rise in pH (due to liberation of caustic by the oxygenation of the sodium lignite mercaptide to the disulfide form) followed by a less rapid decrease in pH as the aeration proceeded (due to the consumption of caustic in the formation of the sulfonates). The initial rise in pH (the peak value of which occurred within one hour, usually at about one-half hour after aeration began) was from one to three pH units for the various batches. The decrease in pH from its peak value was from one to nearly 2 pH units, one and one-half being an average. A typical pH curve for the aeration of a sodium lignite mercaptide oxidation where the lignite mercaptide contains 6.7 percent elemental sulfur is a rise in pH from 9.5 to 11.5 in approximately 30 minutes followed by a decrease to about 10.5 during a subsequent 23½ hours of aeration. The change in pH during the last 20 hours of aeration is very gradual, amounting to only a few tenths of a unit.

EXAMPLE IV

The dried sodium lignite sulfonates obtained in Example III were tested in both untreated and lime-base muds. The untreated mud (B) was conventional base treating stock thinned with about 10% of water. The lime-base mud (L) was ordinary base treating stock thinned with about 10% of water and having added thereto two pounds per barrel of NaOH and 5 pounds per barrel of lime.

The results of the tests in these muds are shown in the following Table IV:

*Table IV*

YIELD VALUE

| Sulfonate, lb./bbl. | Mud | Percent Elemental Sulfur in the Sulfonate Added | | | | |
|---|---|---|---|---|---|---|
| | | 3.5 | 6.7 | 12 | 18 | 25 |
| 2 | B | 15 | 12 | 25 | 22 | 27 |
| 4 | B | 10 | 9 | 12 | 16 | 15 |
| 5 | L | 8 | 8 | 18 | 27 | 50 |
| 7 | L | 4 | 4 | 6 | 8 | 9 |

GELS (ZERO/10′)

| 2 | B | 11/47 | 8/40 | 16/66 | 17/62 | 16/67 |
| 4 | B | 2/42 | 1/39 | 8/52 | 10/53 | 10/57 |
| 5 | L | 3/62 | 3/46 | 16/114 | 34/139 | 51/84 |
| 7 | L | 1/12 | 0/11 | 1/38 | 4/64 | 6/74 |

The untreated mud B without any sulfonate had a yield value of 94 and gels of 77/167. The lime-base mud without any sulfonate was too thick to measure.

EXAMPLE V

A lignite sulfonate was made using ozone instead of air for the oxygenation step. Thus, 600 parts of lignite, 225 parts of NaOH and 2280 parts of water were refluxed in a water bath for one hour. Thereafter, 75 parts of elemental sulfur and the refluxed mixture were placed in an autoclave wherein the charge was heated for 5 hours at a temperature of approximately 300° F. After cooling, the resulting liquid reaction product had only an insignificant amount of uncombined sulfur and had a pH of 8.1. The charge was then diluted somewhat with water and aerated at a temperature of about 105° F. during which time the pH rose rapidly to 10 and then began to drop. Ozone-enriched oxygen (1.5% ozone) was then introduced continuously following which the pH dropped to 9 after 3 hours of ozonation. Continued ozonation for an additional 3 hours dropped the pH to 5.7. The liquid charge was then dried to constant weight. The resulting products contained 12.6 percent, based upon the raw lignite originally taken, of sulfur in the form of the sulfonate.

Another product was prepared in the same manner except only 40 grams of elemental sulfur was employed resulting in a product with 6.7% sulfur, based upon original lignite, in the sulfonate form.

Six pounds per barrel of these products were added to lime-base muds prepared as described in Example IV. The results were as follows:

*Table V*

| Lignite Sulfonate Sample | Yield Value | Gels 0/10 |
|---|---|---|
| 12.6% S | 14 | 5/112 |
| 6.7% S | 12 | 2/75 |

From the foregoing it will be seen that this invention is one well adapted to attain all of the ends and objects hereinabove set forth, together with other advantages which are obvious and which are inherent to the composition and method.

It will be understood that certain features and subcombinations are of utility and may be employed without reference to other features and subcombinations. This is contemplated by and is within the scope of the claims.

This application is a division of Serial No. 692,562 filed October 28, 1957, now Patent No. 3,039,958 granted June 19, 1962.

The invention having been described what is claimed is:

1. A process for preparing lignite sulfonate which comprises suspending lignite and elemental sulfur in an alkaline reaction medium containing from 15 to 100 parts of an alkali metal hydroxide per 100 parts of lignite, maintaining the temperature of the resulting mixture at a temperature within the range of 246° to 375° F. until an amount of said sulfur selected from the range of 1 to 40 parts per 100 parts of said lignite has reacted with the latter, oxidizing the resulting thio-lignite with air at a temperature in the range of 40° to 375° F. to form lignite disulfide, and oxygenating said disulfide with a material selected from the group consisting of air, oxygen, ozone and mixtures thereof at a temperature in the range of 40° to 375° F. to form said sulfonate.

2. The process of claim 1 wherein the amount of elemental sulfur reacted with said lignite is about 6.7 parts per 100 parts of lignite.

3. The process of claim 1 wherein ozone is employed in oxygenating said disulfide.

4. A process for increasing the hydrophillic properties of lignite which comprises reacting lignite with from 1 to 40 parts of elemental sulfur per 100 parts of said lignite in an aqueous alkaline reaction medium containing from 15 to 100 parts of an alkali metal hydroxide per 100 parts of lignite at a temperature in the range of 246° to 375° F. and oxygenating the resulting reaction product with a material selected from the group consisting of air, oxygen, ozone and mixtures thereof at a temperature in the range of 40° to 375° F.

5. The process of claim 4 wherein the amount of said oxygenating agent employed is sufficient to convert said resulting reaction product to lignite disulfide.

6. The process of claim 4 wherein the amount of said oxygenating agent employed is sufficient to convert said resulting reaction product to lignite sulfonate.

7. The process of claim 6 wherein said oxygenating agent comprises ozone.

8. A process for preparing lignite sulfonate which comprises reacting lignite with from 15 to 100 parts of an alkali metal hydroxide per 100 parts of lignite and with from 1 to 40 parts of elemental sulfur per 100 parts of lignite in an aqueous reaction medium by maintaining the temperature thereof in the range of 246° to 375° F., oxidizing the resulting reaction product in an aqueous reaction medium with a material selected from the group consisting of air, oxygen, ozone and mixtures thereof until the pH of such attains a peak value and then continuing the oxidation until the pH of the reaction medium decreases to a substantially constant value.

9. A lignite sulfonate having sulfonate groups in such proportion that they contain from 1 to 40 parts of sulfur, expressed as such, per 100 parts of lignite; and made by reacting lignite with from 1 to 40 parts of elemental sulfur per 100 parts of lignite in aqueous alkaline reaction medium containing from 15 to 100 parts of an alkali metal hydroxide per 100 parts of lignite at a temperature in the range from 246 to 375 degrees F.; and oxygenating the resulting reaction product with a material selected from the group consisting of air, oxygen, ozone and mixtures thereof at a temperature in the range from 40 to 375 degrees F.

10. A sodium lignite sulfonate material containing sulfonate groups in such proportion that they contain from 1 to 40 parts of sulfur, expressed as such, per 100 parts of original lignite and made by a process which comprises reacting lignite with from 1 to 40 parts of elemental sulfur per 100 parts of lignite in an aqueous reaction medium containing 15 to 100 parts of sodium hydroxide per 100 parts of lignite by maintaining the temperature thereof in the range from 246 to 375 degrees F.; oxidizing the resulting reaction product in an aqueous reaction medium with a material selected from the group consisting of air, oxygen, ozone and mixtures thereof until the pH of the medium attains a peak value and continuing the oxidizing reaction until the pH of the reaction medium decreases to a substantially constant value.

11. A lignite disulfide material made by suspending lignite and elemental sulfur in an alkaline reaction medium containing from 15 to 100 parts of an alkali metal hydroxide per 100 parts of lignite, maintaining the temperature of the resulting mixture at a temperature within the range from 246 to 375 degrees F. until an amount of said sulfur in the range from 1 to 40 parts per 100 parts of said lignite has reacted with the lignite; and oxidizing the resulting thio-lignite with a material selected from the group consisting of air, oxygen, ozone and mixtures thereof at a temperature in the range from 40 degrees to 375 degrees F. to disulfide form.

12. A lignite sulfoxide material made by reacting lignite, an alkali metal base and elemental sulfur in aqueous reaction medium containing from 15 to 100 parts of an alkali metal hydroxide per 100 parts of lignite at a temperature in the range from 246 to 375 degrees F. to form an alkali metal thio-lignite; oxidizing the thio-lignite with an oxygenating agent, a material selected from the group consisting of air, oxygen, ozone and mixtures thereof at a temperature in the range from 40 to 375 degrees F. until the thio-lignite has been converted to lignite sulfoxide.

13. A lignite sulfone material made by a process which comprises reacting lignite, an alkali metal base and sulfur in aqueous reaction medium containing from 15 to 100 parts of an alkali metal hydroxide per 100 parts of lignite at a temperature in the range from 246 to 375 degrees F. to form an alkali metal thio-lignite with a material selected from the group consisting or air, oxygen, ozone and mixtures thereof; oxidizing the thio-lignite to form lignite disulfide with said material and oxygenating the disulfide to an extent to convert the disulfide to lignite sulfone.

References Cited in the file of this patent
UNITED STATES PATENTS

| 1,736,014 | Paulson | Nov. 19, 1929 |

FOREIGN PATENTS

| 27,342 | Austria | Aug. 15, 1906 |